United States Patent
Toriumi

(10) Patent No.: US 7,130,914 B2
(45) Date of Patent: Oct. 31, 2006

(54) DATABASE SYNCHRONIZATION SYSTEM AND METHOD

(75) Inventor: Go Toriumi, Tokyo (JP)

(73) Assignee: NEC Corporation, Tokyo (JP)

( * ) Notice: Subject to any disclaimer, the term of this patent is extended or adjusted under 35 U.S.C. 154(b) by 705 days.

(21) Appl. No.: 10/012,501

(22) Filed: Dec. 12, 2001

(65) Prior Publication Data

US 2002/0073109 A1 Jun. 13, 2002

(30) Foreign Application Priority Data

Dec. 13, 2000 (JP) ............................. 2000-378875

(51) Int. Cl.
*G06F 15/16* (2006.01)

(52) U.S. Cl. ...................... 709/232; 709/229; 715/511; 715/530

(58) Field of Classification Search ................ 715/511, 715/530, 501.1, 526; 709/203, 212, 229, 709/232, 217; 707/204
See application file for complete search history.

(56) References Cited

U.S. PATENT DOCUMENTS

| | | | | |
|---|---|---|---|---|
| 5,608,720 | A * | 3/1997 | Biegel et al. ................ | 370/249 |
| 6,507,273 | B1 * | 1/2003 | Chang et al. ................ | 340/3.1 |
| 6,633,905 | B1 * | 10/2003 | Anderson et al. ............ | 709/219 |
| 6,657,534 | B1 * | 12/2003 | Beer et al. ................... | 340/3.1 |
| 6,694,337 | B1 * | 2/2004 | King et al. .................. | 707/201 |
| 6,708,187 | B1 * | 3/2004 | Shanumgam et al. ....... | 707/201 |
| 6,711,613 | B1 * | 3/2004 | Ewing et al. ................ | 709/223 |
| 6,721,735 | B1 * | 4/2004 | Lee ............................... | 707/5 |
| 6,775,830 | B1 * | 8/2004 | Matsunami et al. ......... | 717/176 |
| 6,779,002 | B1 * | 8/2004 | Mwaura ...................... | 707/203 |
| 2001/0014893 | A1 * | 8/2001 | Boothby ...................... | 707/201 |
| 2002/0073085 | A1 * | 6/2002 | O'Day et al. ................. | 707/10 |
| 2003/0037020 | A1 * | 2/2003 | Novak et al. ................. | 707/1 |

FOREIGN PATENT DOCUMENTS

| | | |
|---|---|---|
| JP | 11-25017 A | 1/1999 |
| JP | 2000-20179 A | 1/2000 |
| JP | 2000-076218 | 3/2000 |

* cited by examiner

*Primary Examiner*—Stephen Hong
*Assistant Examiner*—Gregory J. Vaughn
(74) *Attorney, Agent, or Firm*—Sughrue Mion, Max

(57) ABSTRACT

A synchronization system and method for databases by which the immediacy of synchronization between the databases can be assured without dialup connection and the power supply to an information terminal need not always be on to keep the information terminal in a standby state is disclosed. The database synchronization system synchronizes data of databases of an application server and an information terminal connected to each other through a network. A first database information update notification section provided in the application server extracts only differential information of the database of the application server and issues a notification of the differential information to the information terminal. A second database information update notification section provided in the information terminal extracts only differential information of the database of the information terminal and issues a notification of the differential information to the application server. A data buffer receives the differential information transmitted from the first database information update notification section, temporarily stores the received differential information and transfers the stored differential information to the information terminal. A power supply control section controls a power supply for the information terminal when the differential information from the first database information update notification section is stored into the data buffer.

13 Claims, 11 Drawing Sheets

DATABASE SYNCHRONIZATION SYSTEM AND METHOD

BACKGROUND OF THE INVENTION

1. Field of the Invention

The present invention relates to a synchronization system and method for databases, and more particularly to a system and a method for synchronizing a database of an information terminal connected to the Internet through a packet communication line and another database of an application server connected normally to the Internet with each other.

2. Description of the Related Art

Conventionally, in a synchronization system and method for databases of the type described, if it is tried to start synchronization from the information terminal side, then it is necessary for the information terminal to perform dialup connection to a service provider on the Internet to establish a connection between applications and communicate data with the database of the application server to establish synchronism.

Also when it is tried to establish synchronism from the application server side normally connected to the Internet, the application server performs dialup connection to a telephone circuit connected to the information terminal through the service provider to establish a connection to the information terminal to establish a connection between the applications to establish synchronism.

Recently, such a new service as described below has become available. In particular, referring to FIG. 11, a mail server 1 on the service provider side and a personal computer 2 of the user side are connected to an ISDN network 5 through terminal adapters 3 and 4 provided therefor, respectively. According to the new service, if an electronic mail destined for the user arrives at the mail server 1 of the service provider, then the termination information is transmitted to the terminal adapter 4 of the user side using a D channel packet of the ISDN network.

The conventional system, however, has the following disadvantages.

The first disadvantage resides in that, in order to establish synchronism between the database of the application server and the database of the information terminal, dialup connection by a telephone circuit is required. For the immediacy of synchronization between the databases, dialup connection must be performed every time data of the databases are updated, and this requires a corresponding cost. On the other hand, in order to suppress the cost, synchronism is established after data are updated several times, and this makes the updating period long.

The second disadvantage resides in that the power supply to the information terminal is normally on. This is because, although the power supply to the information terminal must be on naturally when an operation for synchronization is performed from the information terminal side, also when it is tried to establish synchronism from the application server side, the information terminal must accept dialup connection, and therefore, when an operation for synchronization is to be performed, the information terminal must always be in a standby state with the power supply thereto kept on.

Japanese Patent Laid-Open No. 2000-76218 discloses a synchronization system which allows synchronization between databases with a firewall interposed therebetween. The synchronization system includes an internal database server including an internal database and provided in a firewall, and an external database server including an external database and provided outside the firewall. The internal database server includes an internal differential data extraction section for extracting internal differential data updated within a predetermined period as internal data from among data possessed by the external database. Meanwhile, the external database server includes an external differential data extraction section for extracting external differential data updated within a predetermined period as external data from data possessed by the external database. The internal database server further includes an internal time storage section for storing a start time of a predetermined period with regard to the internal differential data, and an internal data updating confirmation section for confirming whether or not the external database has been updated with the internal differential data. Meanwhile, the external database server further includes an external time storage section for storing a start time of a predetermined period with regard to the external differential data, and an external data updating confirmation section for conforming whether or not the internal database has been updated with the external differential data. If the internal data updating confirmation section confirms that the external database has been updated with the internal differential data, then the internal time storage section updates the start time with regard to the internal differential data. Meanwhile, if the external data updating confirmation section confirms that the internal database has been updated with the external differential data, then the external time storage section updates the start time with regard to the external differential data.

However, also with the synchronization system just described, the power supply to the internal database server must always be on.

SUMMARY OF THE INVENTION

It is an object of the present invention to provide a synchronization system and method for databases by which the immediacy of synchronization between the databases can be assured without dialup connection.

It is another object of the present invention to provide a synchronization system and method for databases by which the power supply to an information terminal need not always be on to keep the information terminal in a standby state.

In order to attain the objects described above, according to an aspect of the present invention, there is provided a database synchronization system for synchronizing data of databases of a first apparatus and a second apparatus connected to each other through a network, comprising first differential information update notification means provided in the first apparatus for extracting only differential information of the database of the first apparatus and issuing a notification of the differential information to the second apparatus, second differential information update notification means provided in the second apparatus for extracting only differential information of the database of the second apparatus and issuing a notification of the differential information to the first apparatus, a power supply for the second apparatus, a data buffer for receiving the differential information transmitted from the first differential information update notification means, temporarily storing the received differential information and transferring the stored differential information to the second apparatus, and power supply control means for controlling the power supply for the second apparatus when the differential information from the first differential information update notification means is stored into the data buffer.

Where the network is the Internet, the second apparatus may be connected to the first apparatus through a server of a service provider on the Internet.

The data buffer and the power supply control means may be included in a packet communication apparatus which performs packet communication on the first apparatus side. In order to facilitate carrying of the second apparatus, the packet communication apparatus may be built in the second apparatus. In this instance, the packet communication apparatus built in the second apparatus is normally kept in an operating state with an internal power supply thereof, and when a notification of update of data is received from an application server, the packet communication apparatus controls the power supply of the second apparatus by means of the power supply control means thereof to activate the second apparatus so that the database of the second apparatus may be updated.

The packet communication apparatus may transfer, when the data buffer receives the differential information from the first differential information update notification means while the power supply for the second apparatus is off, the differential information in the data buffer to the second apparatus after the power supply of the second apparatus is placed into an on state by the power supply control means. In this instance, update of the database can be realized by storing the database update information packet in the data buffer and polling the data buffer of the packet communication when the power supply to the second apparatus is switched on or at any time after that.

The power supply control means may control the power supply for the second apparatus to an off state when update of the database of the second apparatus is completed.

A packet conversion server may be built in the first apparatus. The first apparatus thus has a function as a service provider. Therefore, communication can be performed without the intervention of the Internet. Consequently, a system having a better response can be realized.

According to another aspect of the present invention, there is provided a database synchronization method for synchronizing data of databases of a first apparatus and a second apparatus connected to each other through a network, comprising the steps of storing, when differential information of the database of the first apparatus is transmitted from the first apparatus to the second apparatus while the power supply for the second apparatus is off, the differential information into a data buffer of a packet communication apparatus on the first apparatus side, controlling the power supply for the second apparatus to an off state by power supply control means of the packet communication apparatus, and transferring the differential information of the data buffer to the second apparatus and updating the database of the second apparatus.

The power supply control means may control the power supply for the second apparatus to an off state after update of the database of the second apparatus is completed.

The database synchronization system and the database synchronization method are advantageous in that the two databases of the first and second apparatus can always be synchronized with each other whether or not the power supply of the second apparatus, which may be an information terminal, is on. The database synchronization system and the database synchronization method are advantageous also in that, since any application server need not establish a dialup connection every time synchronization is performed, the cost can be reduced as much.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
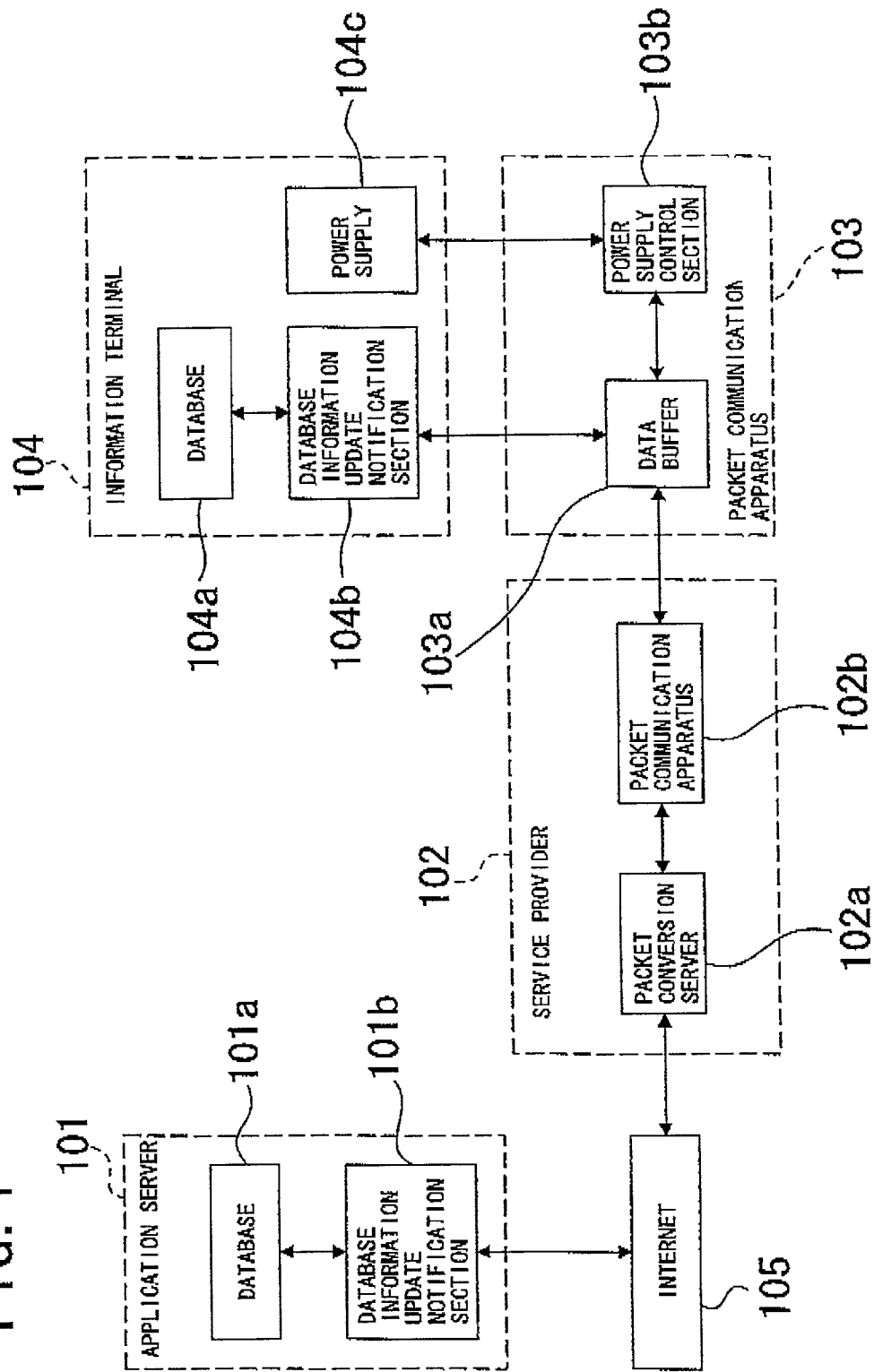
FIG. 1 is a block diagram of a synchronization system for databases to which the present invention is applied.

Referring to FIG. 1, there is shown a synchronization system to which the present invention is applied. The synchronization system includes an application server 101 which in turn includes a database 101a and a database information update notification section 101b, a service provider 102 which in turn includes a packet conversion server 102a normally connected to the Internet 105 and a packet communication apparatus 102b, a packet communication apparatus 103 which in turn includes a data buffer 103a and a power supply control section 103b, and an information terminal 104 which in turn includes a database 104a, a database information update notification section 104b and a power supply 104c. The packet communication apparatus 103 receives power supply separately from the information terminal 104.

The application server 101 is normally connected to the Internet 105, and stores data updated and used on the Internet 105 in the database 101a. The database information update notification section 101b controls the information update of the database 101a. It is to be noted that the synchronization system of the present invention can be applied not only where the Internet is used for communication between the application server 101 and the service provider 102 but also where another network such as an in-company LAN and an in-house LAN is used.

As data stored in the database 101a, various data may be used depending upon what the information terminal 104 particularly is. For example, where the information terminal 104 is a portable digital assistant (PDA), the data may be a schedule of the user; where the information terminal 104 is a video recording apparatus, the data may be television program reservation information; where the information terminal 104 is an air conditioner, the data may be a timer or temperature adjustment information of the air conditioner; and where the information terminal 104 is a refrigerator, the data may be table information of objects accommodated therein at present.

The database information update notification section 101b has a function of notifying the packet conversion server 102 of updated differential information through the Internet 105 when the data of the database 110a are updated. Further, the database information update notification section 101b has another function of reflecting, on the database 101a, database update differential information transmitted thereto from the packet conversion server 102a of the service provider 102 when the database 104a of the information terminal 104 is updated.

Figure 2:
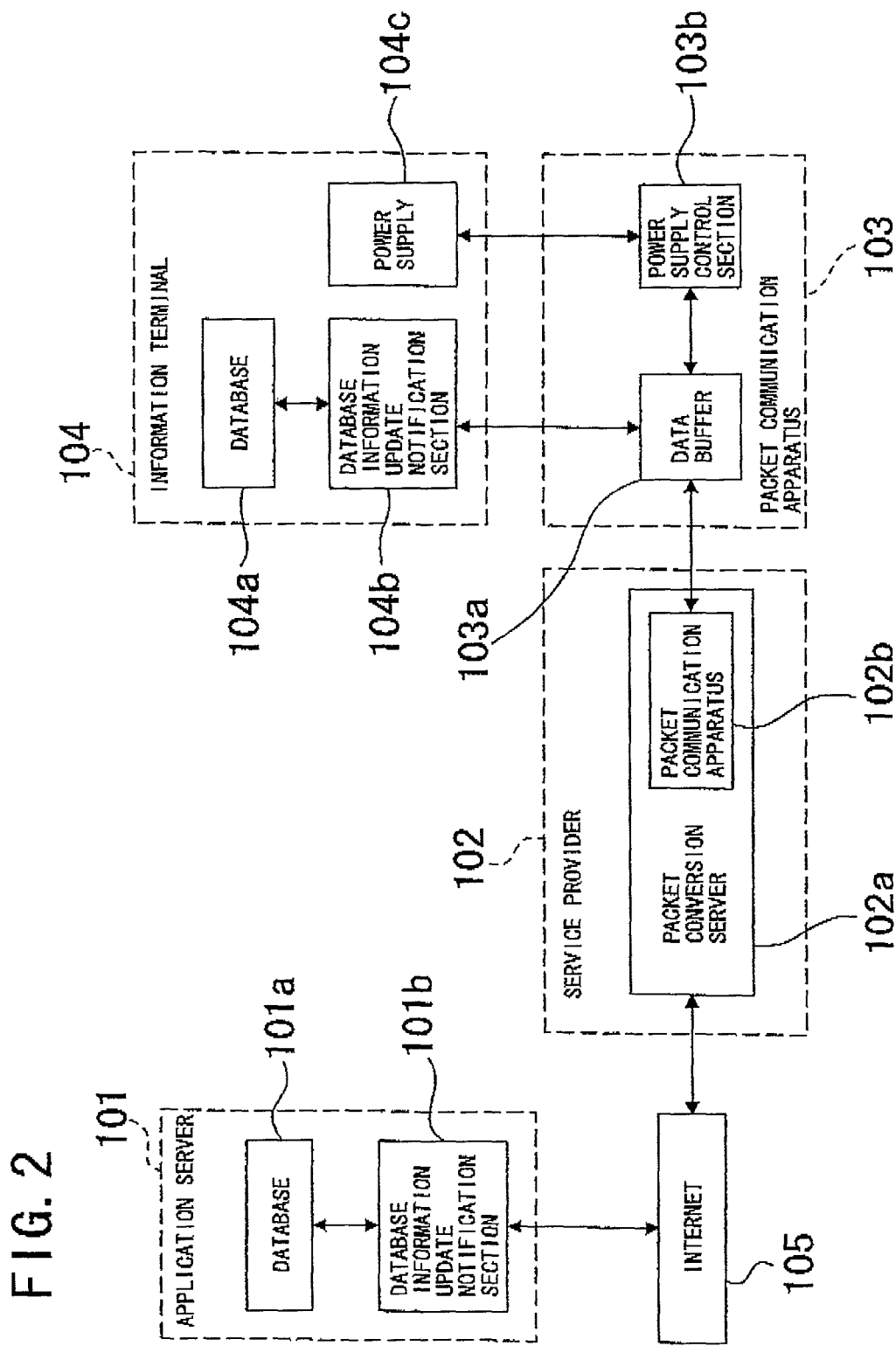
FIG. 2 is a similar view but showing a modification to the synchronization system for databases shown in FIG. 1.

The service provider 102 is normally connected to the Internet 105 at the packet conversion server 102a thereof and performs packet communication with the packet communication apparatus 103 of the information terminal 104 side through the packet communication apparatus 102b. It is to be noted that, if the packet communication apparatus 102b is built in the packet conversion server 102a as shown in FIG. 2, then the apparatus of the service provider 102 can be simplified.

The packet conversion server 102a has a function of converting, if the database 101a of the application server 101 is updated and update differential information is received from the database information update notification section 101b, the information into packets and transmitting the packets to the packet communication apparatus 102b. Further, the packet conversion server 102a has a function of converting, when the database 104a in the information terminal 104 is updated, a packet of the database update information received by the packet communication apparatus 102b into normal database update differential information and transmitting the normal database update differential information to the database information update notification section 101b of the application server 101.

The packet communication apparatus 102b has a function of performing packet communication of update information of the database 101a of the application server 101 passed thereto from the packet conversion server 102a through a packet communication line. Further, the packet communication apparatus 102b has another function of receiving update information of the database 104a of the information terminal 104 transmitted thereto from the packet communication apparatus 103 and passing the update information to the packet conversion server 102a.

The packet communication apparatus 103 has a function for performing packet communication through the packet communication line similarly to the packet communication apparatus 102b. Further, the packet communication apparatus 103 temporarily stores packet information transmitted thereto into the data buffer 103a and controls the power supply 104c of the information terminal 104 connected thereto by means of the power supply control section 103b. Upon actual system construction, a method wherein a terminal adapter of an ISDN network is used as the packet communication apparatus 103 and a D channel packet is used as the packet or another method wherein a router of the Internet is used as the packet communication apparatus 103 and an IP packet is used as the packet may be used.

The data buffer 103a has a function of temporarily storing a packet of update differential information of the database 101a transmitted thereto from the packet communication apparatus 102b of the service provider 102 to prevent occurrence of miss of data also when the information terminal 104 is not normally in a power supply on state.

The power supply control section 103b has a function of switching on, if the power supply 104c of the information terminal 104 is not on when a packet which is transmitted upon updating of the database 101a of the application server 101 arrives at the packet communication apparatus 103, the power supply 104c of the information terminal 104 if necessary to immediately update the database 104a of the information terminal 104. The power supply control section 103b further has a function of switching off the power supply 104c if necessary after the update of the information is reflected on the database 104a.

The information terminal 104 receives power supplied from the power supply 104c thereof and has a function of updating the information of the database 104a through the database information update notification section 104b when the update information of the database 101a of the application server 101 is received from the packet communication apparatus 103 and issuing a notification of the differential information to the packet communication apparatus 103 through the database information update notification section 104b when the information of the database 104a is updated by the user.

The database 104a operates in synchronism with contents of the database 110a of the application server 101 normally connected to the Internet 105 and determines operation and displaying contents of the information terminal 104 based on the information of the database 101a. For example, if the information terminal 104 is an information terminal for a video deck and the data of the database 104a are picture recording reserving information, then if new program information is added to a picture recording reserving information database of the information terminal side, then contents similar to the information just described are reflected in synchronism on a picture recording reserving information database of a database application server of the video deck. As a result, the picture recording reservation can be realized.

The database information update notification section 104b has a function of issuing, when the data of the database 104a are updated, a notification of the updated differential information to the packet communication apparatus 103. The database information update notification section 104b has also a function of reflecting, when the database 101a of the application server 101 is updated, the database update differential information transmitted thereto from the packet communication apparatus 103 on the database 104a.

The power supply 104c is subject to switching on-off control by the power supply control section 103b of the packet communication apparatus 103.

Operation when the database 104a of the information terminal 104 is updated is described below in detail with reference to FIGS. 1 and 3.

Figure 3:
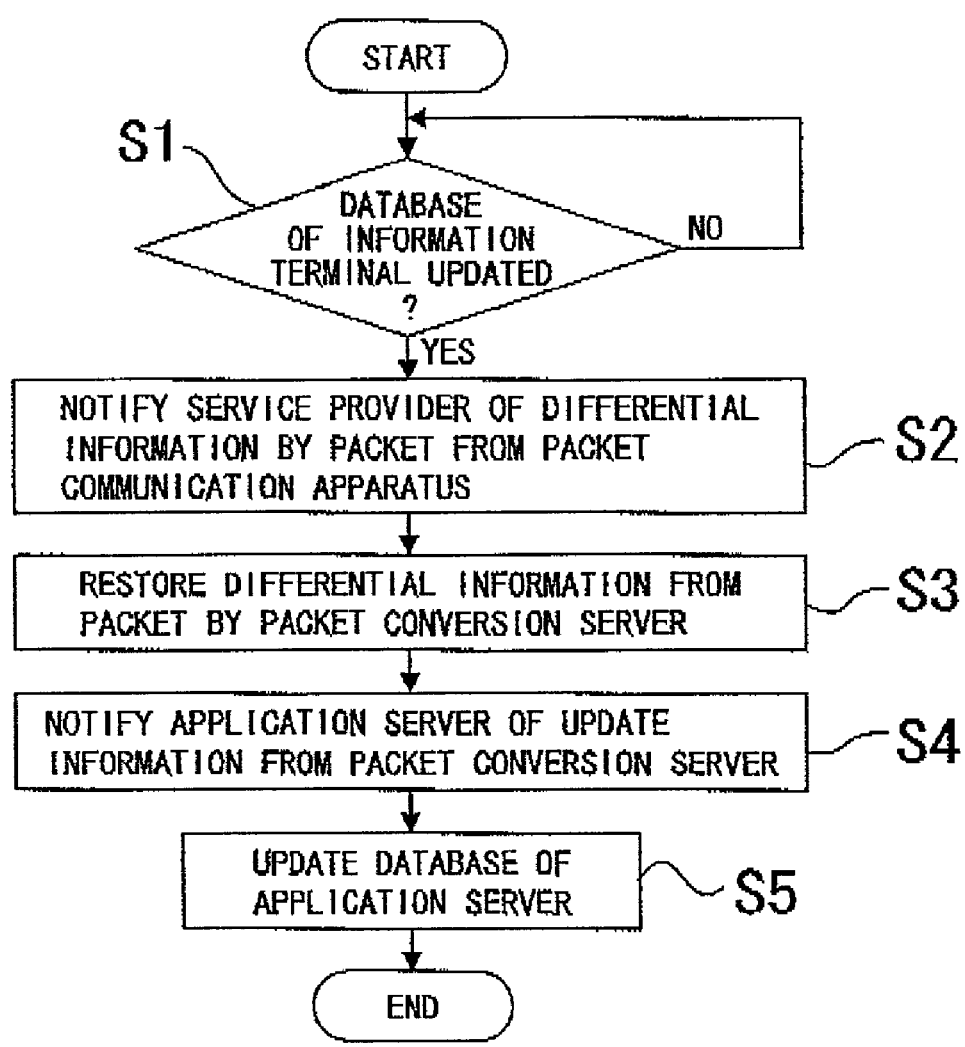
FIG. 3 is a flow chart illustrating processing of the synchronization system for databases of FIG. 1 when a database of an information terminal is updated.

If the database 104a of the information terminal 104 of FIG. 3 is updated (step S1), then the database information update notification section 104b transmits the updated differential information to the packet communication apparatus 103, and the packet communication apparatus 103 transmits a database update differential packet to the packet communication apparatus 102b of the service provider 102 through the packet communication line (step S2). The packet communication apparatus 102b of the service provider 102 receives the packet and passes it to the packet conversion server 102a, and the packet conversion server 102a restores the differential information of the database based on the database differential information packet (step S3). Then, the packet communication apparatus 102b transmits resulting information to the application server 101 through the Internet 105 (step S4). The database information update notification section 101b of the application server 101 synchronizes the data of the database 101a with the database 104a of the information terminal 104 based on the differential information (step S5).

Figure 4:
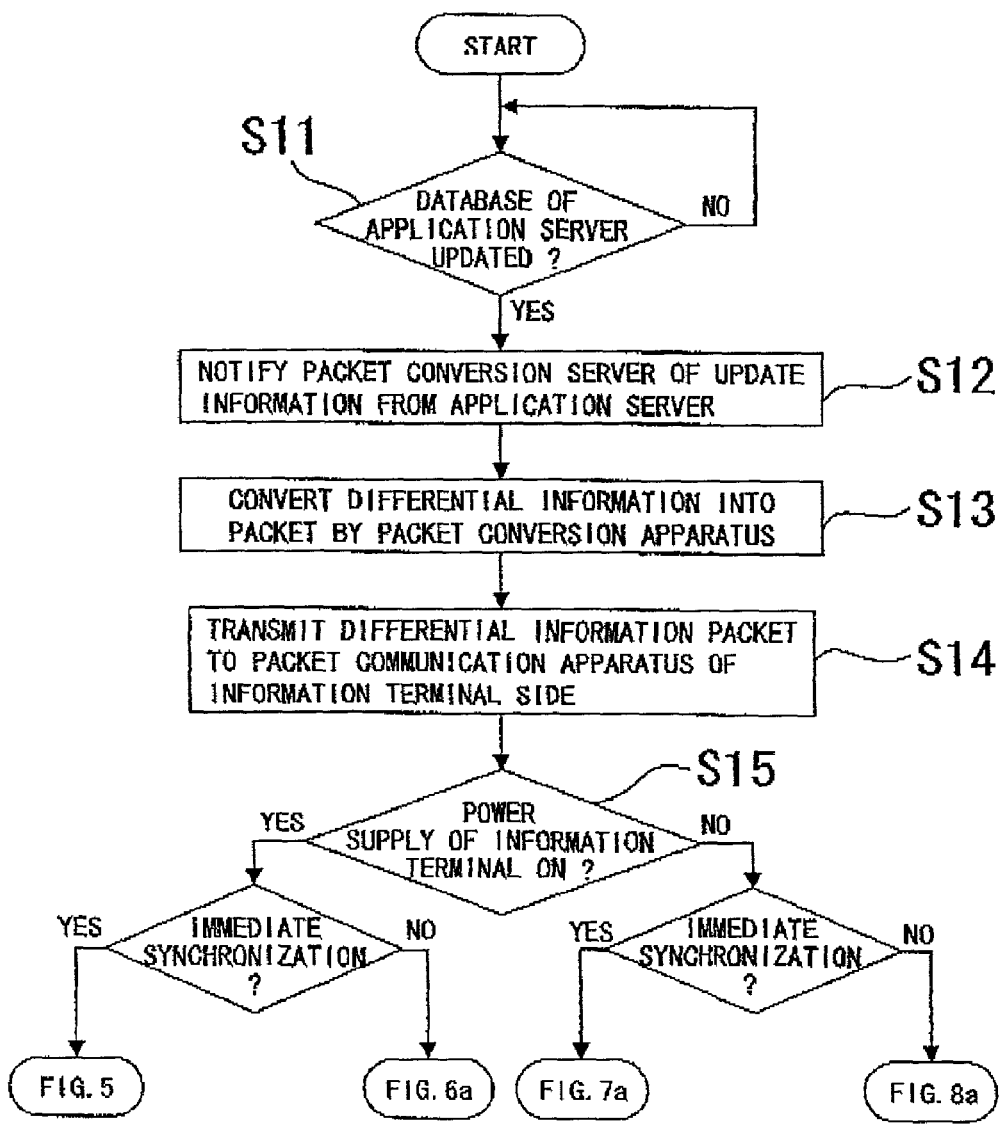
FIG. 4 is a flow chart illustrating an example of processing of the synchronization system for databases of FIG. 1 when a database of an application server is updated.

Operation when the database 101a of the application server 101 is updated is described below in detail with reference to FIGS. 1 and 4.

If the database 101a of the application server 101 is updated (step S11), then the database information update notification section 101b issues a notification of the differential information to the packet conversion server 102a of the service provider 102 through the Internet (step S12). The packet conversion server 102a converts the differential information of the database transmitted thereto into information of a format suitable for packet communication and transmits the resulting information to the packet communication apparatus 102b (step S13). Further, the packet conversion server 102a transmits the information to the packet communication apparatus 103 of the information terminal 104 side using packet communication of the packet communication line (step S14). The packet communication apparatus 103 discriminates whether or not the power supply 104c of the information terminal 104 is in an on state (step S15).

As a particular method wherein the information terminal 104 receives the database update information from the packet communication apparatus 103 to update the database 104a, for example, four methods described below are available.

Figure 5:
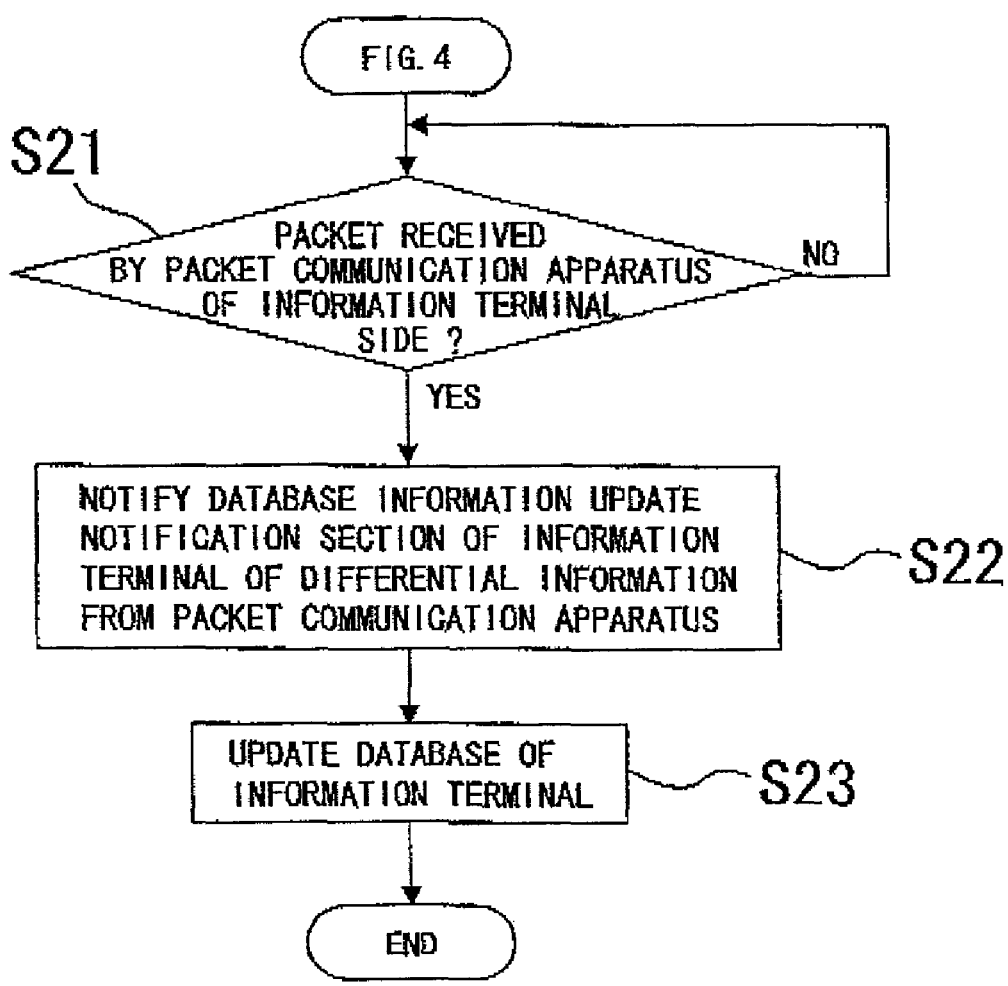
FIGS. 5, 6a and 6b, 7a and 7b, and 8a and 8b are flow charts illustrating different examples of processing of a packet communication apparatus and the information terminal when the database of the application server is updated.

According to the first method, the information terminal 104 immediately performs update of the database 104a when a packet is transmitted thereto while the power supply 104c of the terminal information 104 is in an on state. Processing of the first method is illustrated in a flow chart of FIG. 5. Referring to FIG. 5, when the packet communication apparatus 103 receives a database differential information packet (step S21), the packet communication apparatus 103 immediately passes the packet to the database information update notification section 104b of the information terminal 104 (step S22). Thus, the information terminal 104 updates the database 104a thereof for synchronization (step S23).

Figure 6A:
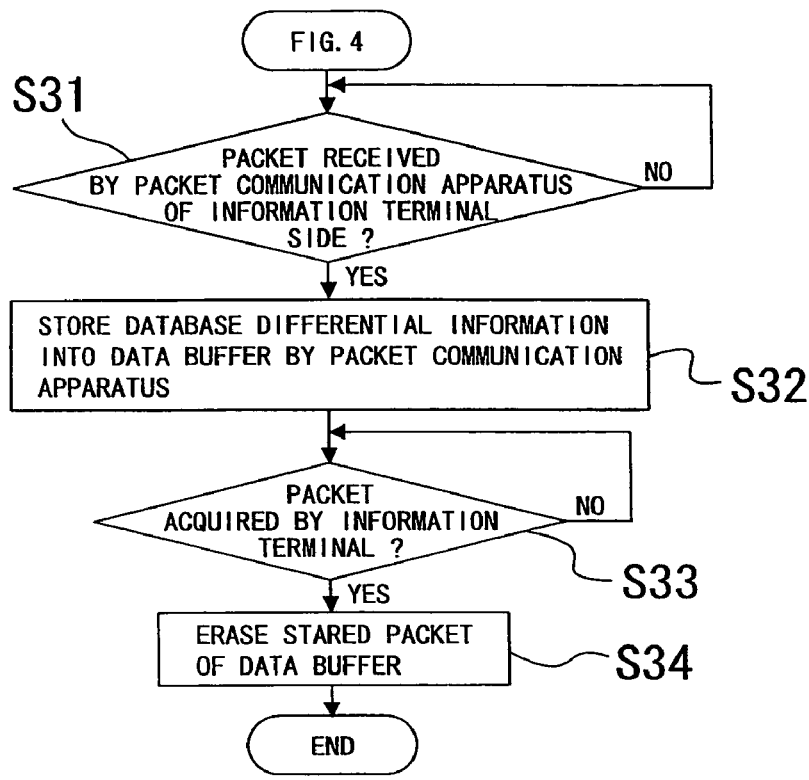
Figure 6B:
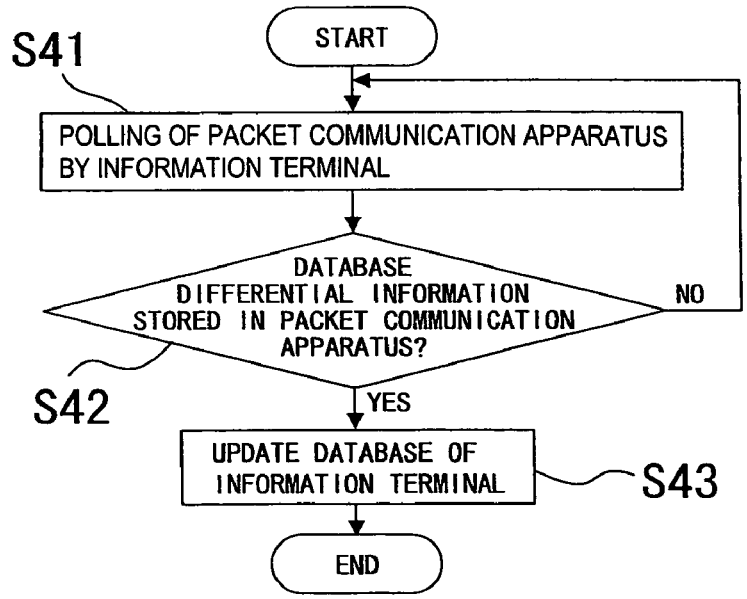

According to the second method, the information terminal 104 performs update of the database 104a later after a packet is transmitted thereto while the power supply 104c of the information terminal 104 is in an on state. Processing of the second method is illustrated in flow charts of FIGS. 6a and 6b. Referring to first to FIG. 6a, if the packet communication apparatus 103 receives a packet (step S31), then the packet communication apparatus 103 not immediately issues a notification of the packet but buffers the packet into the data buffer 103a (step S32). Meanwhile, referring to FIG. 6b, the information terminal 104 occasionally performs polling whether or not a packet arrives at the packet communication apparatus 103 (step S41). If a packet is transmitted thereto (step S42), then the database information update notification section 104b updates the database 104b to synchronize the database 104b with the database 101a of the application server 101 (step S43). It is to be noted that the routine illustrated in FIG. 6b is periodically started by a timer interrupt as well known in the art (this similarly applies to the routines illustrated in FIGS. 7b and 8b). Referring back to FIG. 6(a), it is discriminated whether or not the update of the database 104a is ended (step S33), and if the update of the database 104a is ended, then the packet stored in the data buffer is deleted (step S34).

Figure 7A:
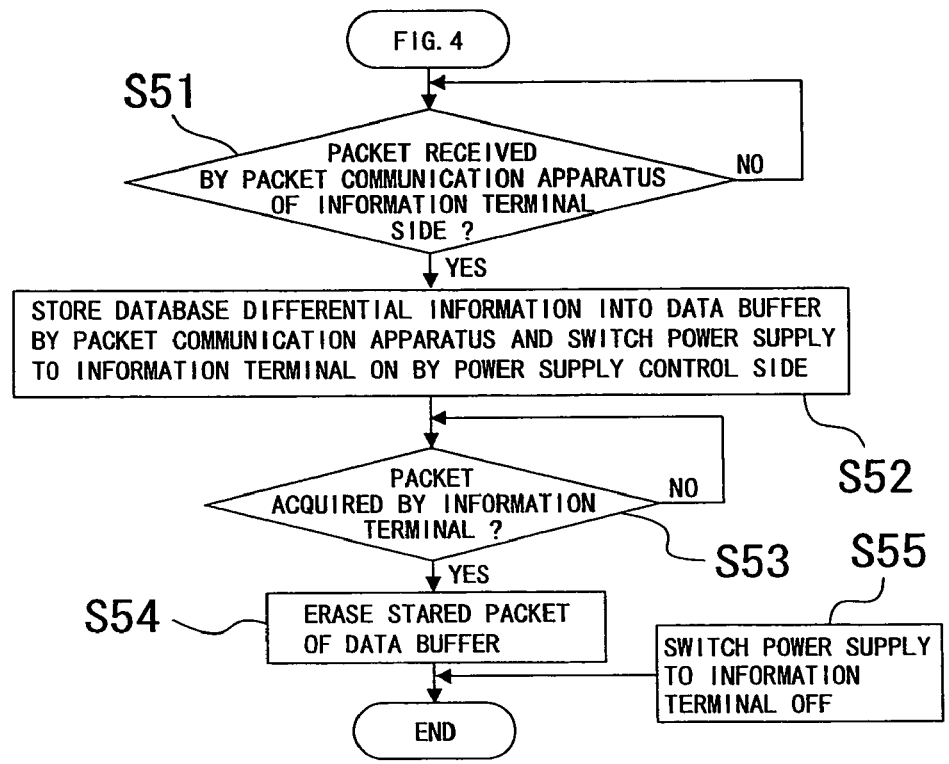
Figure 7B:
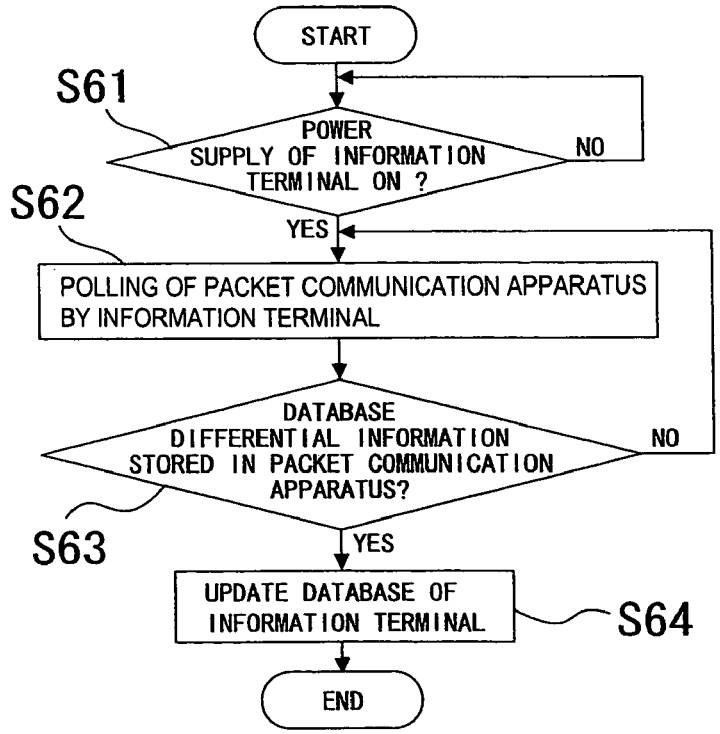

According to the third method, if a packet arrives while the power supply 104c of the information terminal 104 is not in an on state, then the information terminal 104 switches on the power supply 104c and immediately performs update of the database 104a. Processing of the third method is illustrated in flow charts of FIGS. 7a and 7b. Referring first to FIG. 7a, if the packet communication apparatus 103 receives a differential information packet (step S51), then it not only temporarily stores the packet into the data buffer 103a but also switches on the power supply 104c of the information terminal 104 using the power supply control section 103b (step S52). Referring now to FIG. 7(b), it is discriminated occasionally whether or not the power supply 104c is in an on state (step S61). If the power supply 104c is in an on state, then the information terminal 104 immediately performs polling of the packet communication apparatus 103 (step S62). Further, it is discriminated whether or not differential information exists in the data buffer 103a (step S63). If differential information exists, then the information terminal 104 issues a notification of the differential information of the database 110a of the application server 101 to the database information update notification section 104b to update the database 104a perform synchronization (step S64). Referring back to FIG. 7a, it is discriminated whether or not the update of the database 104a is ended (step S53). If the update of the database 104a is ended, then the packet stored in the data buffer 103a is deleted (step S54). Further, after the synchronization is completed, the information terminal 104 switches off the power supply 104c by itself or under the control of the power supply control section 103b of the packet communication apparatus 103 (step S55). As a result, the information terminal can restore the original power supply off state.

Figure 8A:
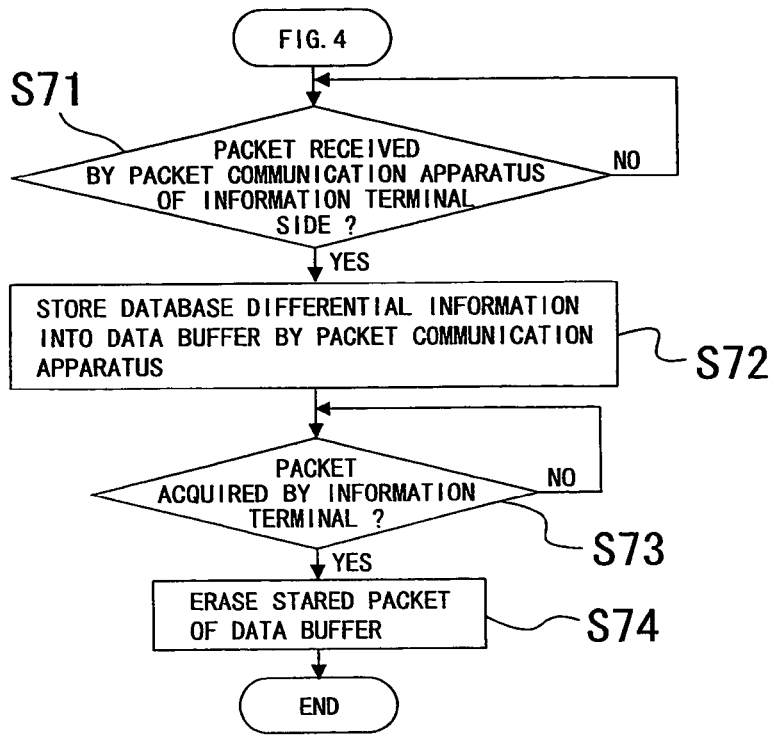
Figure 8B:
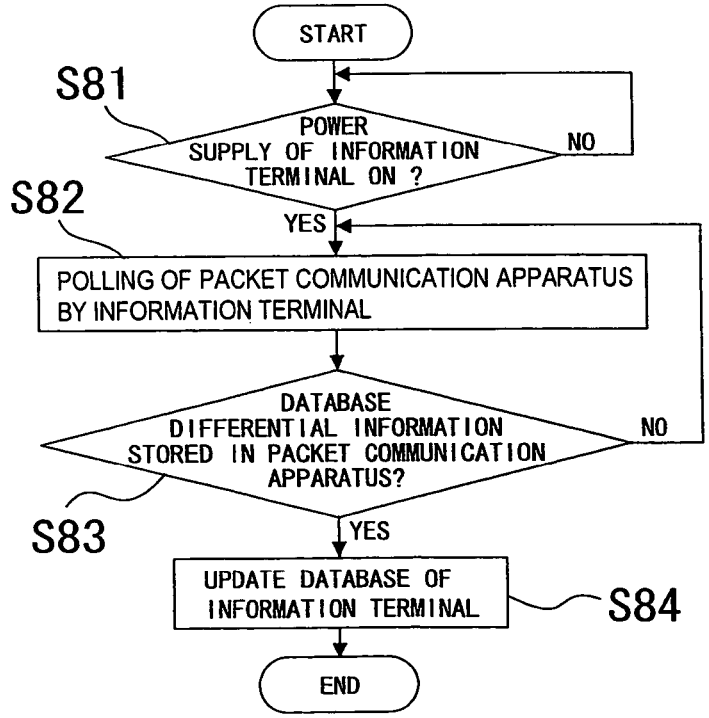

According to the fourth method, the information terminal 104 performs update of the database later after a packet is transmitted thereto while the power supply 104c of the information terminal 104 is not in an on state. Processing of the fourth method is illustrated in flow charts of FIGS. 8a and 8b. Referring to FIG. 8a, if the packet communication apparatus 103 receives a packet (step S71), then the packet communication apparatus 103 does not issues a notification to the information terminal 104 but instead buffers the differential information packet into the data buffer 103a (step S72). Referring to FIG. 8b, it is discriminated occasionally whether or not the power supply 104c is in an on state as a result of automatic switching on or switching on by manual operation of the power supply 104c of the information terminal 104 (step S81). If the power supply 104c is in an on state, then the information terminal 104 performs polling of the packet communication apparatus 103 (step S82). Further, it is discriminated whether or not differential information exists in the data buffer 103a (step S83). If the differential information exists, then the information terminal 104 issues a notification of the differential information of the database 101a of the application server 101 to the database information update notification section 104b to update the database 104a to perform synchronization. (step S84) Referring back to FIG. 8a, it is discriminated whether or not the update of the database 104a is ended (step S73). If the update of the database 104a is ended, then the packet stored in the data buffer 103a is erased (step S74).

If the first or second method is used when the power supply 104c of the information terminal 104 is in an on state, or if the fourth method is used when the power supply 104c of the information terminal 104 is in an off state, then the packet communication apparatus 103 need not control the power supply 104c of the information terminal 104 any more. Therefore, it is possible to use such a configuration that the power supply control section 103b for exclusive use for the information terminal 104 need not be incorporated in the packet communication apparatus 103.

Another modification to the synchronization system for databases of FIG. 1 is described below with reference to FIG. 9. In the present modification, the information terminal is formed as a portable information terminal by incorporating a packet communication apparatus therein.

Figure 9:
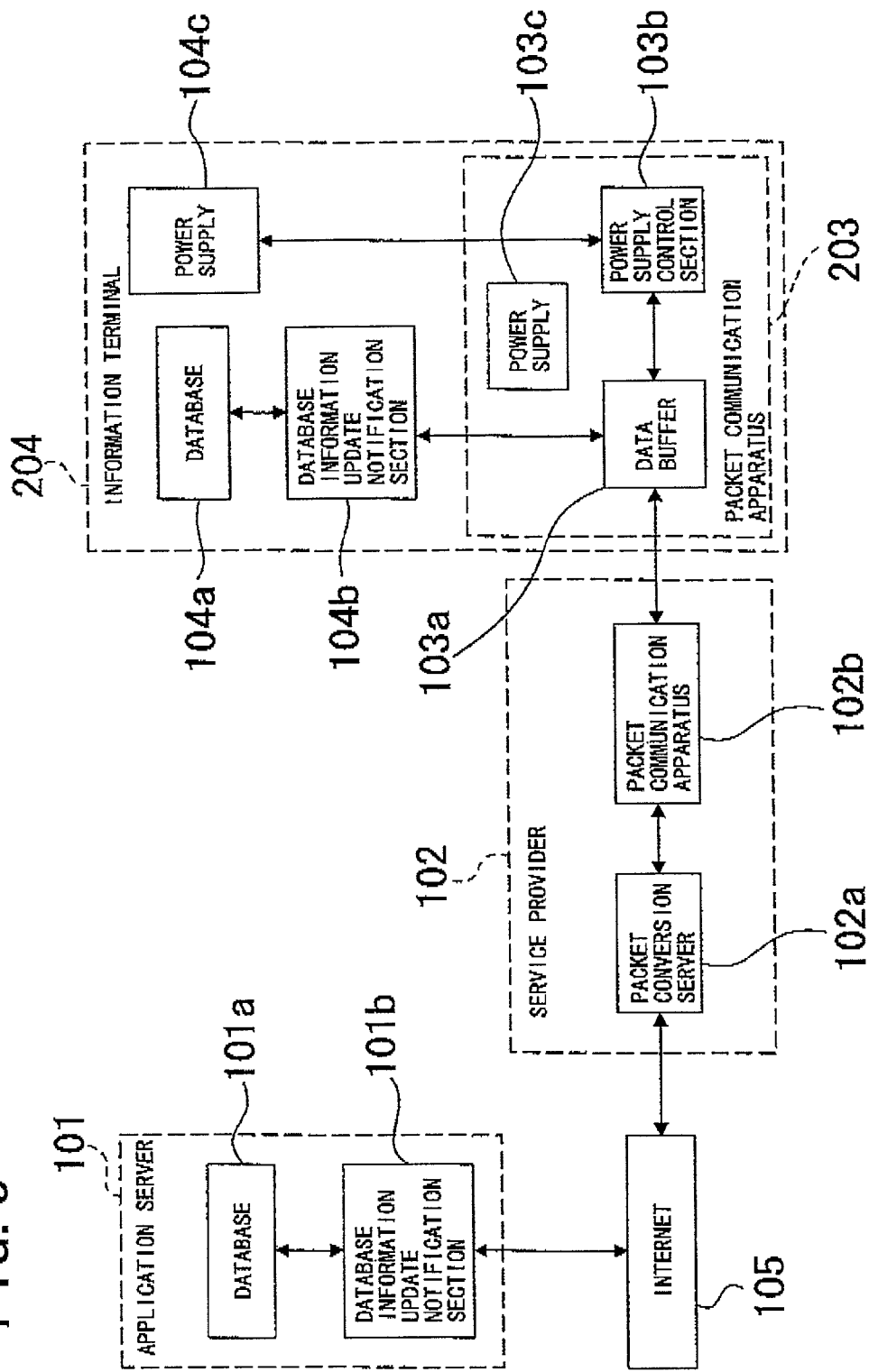
FIG. 9 is a block diagram showing another modification to the synchronization system for databases of FIG. 1.

In particular, the modified synchronization system of FIG. 9 is common in configuration to the synchronization system of FIG. 1 except that it includes an information terminal 204 in place of the information terminal 104 and the packet communication apparatus 103 and a packet communication apparatus 203 which corresponds to the packet communication apparatus 203 but includes, in addition to the data buffer 103a and the power supply control section 103b, an internal power supply 103c is built in the information terminal 204.

The packet communication apparatus 203 of the modified synchronization system operates similarly to the packet communication apparatus 103 of FIG. 1. However, since it includes the internal power supply 103c separate from the power supply 104c of the information terminal 204, even if a database update information packet is transmitted from the packet communication apparatus 102b of the service provider 102 to the information terminal 204 while the power supply 104c of the information terminal 204 is in an off state, synchronization of the database can be realized similarly to that in the synchronization system of FIG. 1.

The internal power supply 103c enables operation of the packet communication apparatus 203 even when the power supply 104c of the information 204 is in an off state. Consequently, occurrence of miss of the update information of the database 101a of the application server 101 can be prevented.

Figure 10:
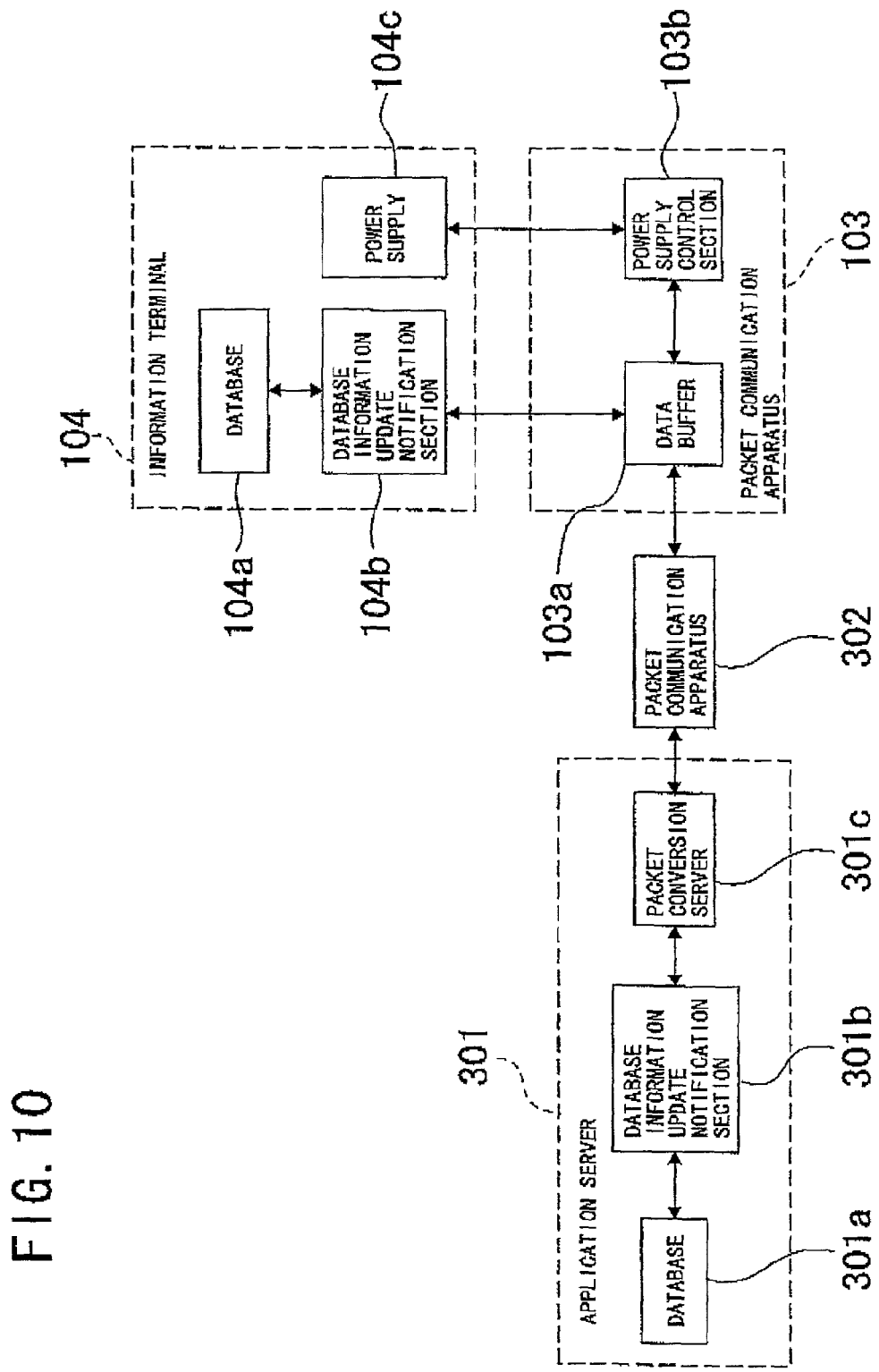
FIG. 10 is a similar view but showing a further modification to the synchronization system for databases of FIG. 1.
Figure 11:
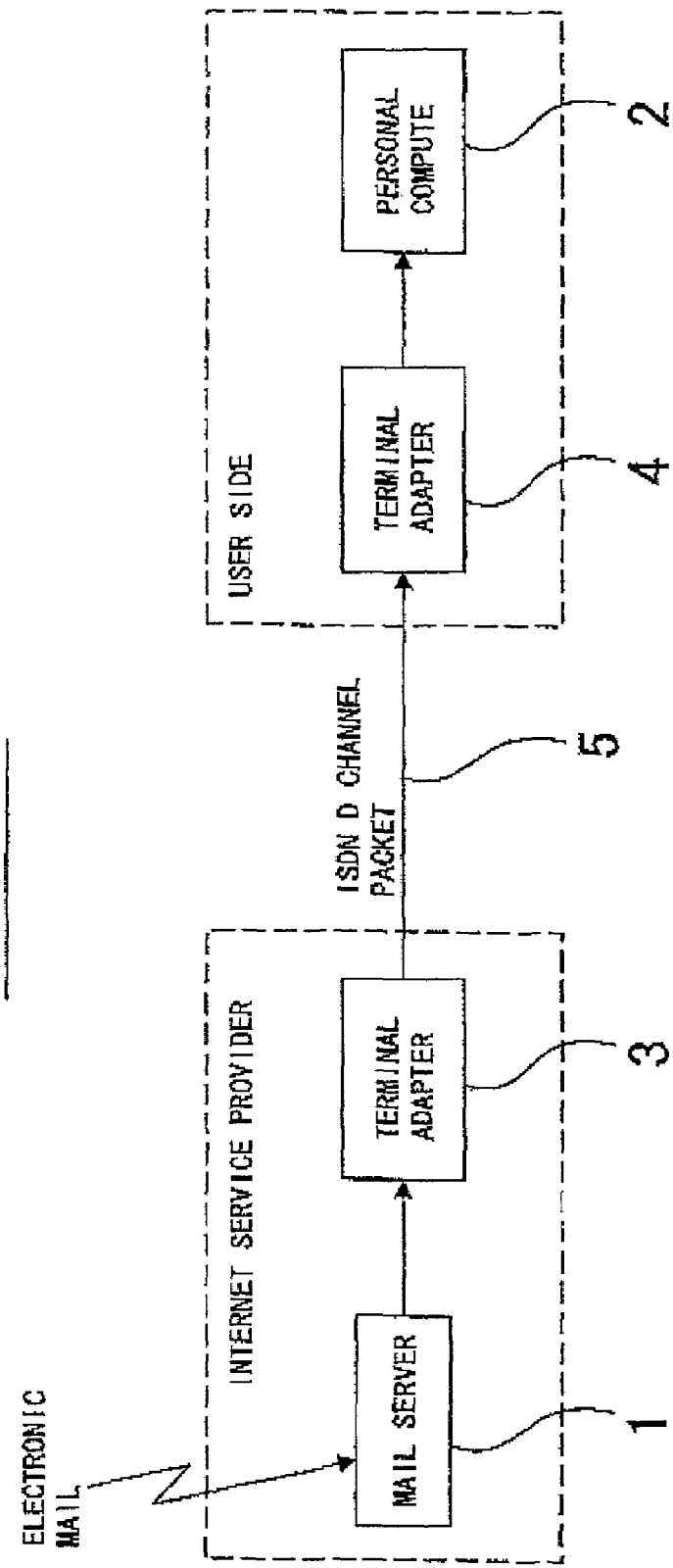
FIG. 11 is a block diagram showing a conventional synchronization system for databases.

A further modification to the synchronization system of FIG. 1 is shown in FIG. 10. Referring to FIG. 10, in the present modification, the responsibility of the system is improved by providing a function provided by the service provider 102 and another function provided by the application server 101 on the same apparatus without the intervention of the Internet.

In particular, the modified synchronization system of FIG. 10 is common in configuration to the synchronization system of FIG. 1 except that it includes an application server 301 and a packet communication apparatus 302 in place of the application server 101, Internet 105 and service provider 102 and the application server 301 includes a database 301a and a database information update notification section 301b, which correspond to the database 101a and the database information update notification section 101b, respectively, of the application server 301, and a packet conversion server 301c, which corresponds to the packet conversion server 102a of the service provider 102. The packet communication apparatus 302 corresponds to the packet communication apparatus 102b of the service provider 102.

The database 301a, database information update notification section 301b and packet conversion server 301c cooperatively form an application server as the same apparatus and do not use a network such as the Internet therebetween.

While a preferred embodiment of the present invention has been described using specific terms, such description is for illustrative purposes only, and it is to be understood that changes and variations may be made without departing from the spirit or scope of the following claims.

What is claimed is:

1. A database synchronization system for synchronizing data of databases of a first apparatus and a second apparatus connected to each other through a network, comprising:
   first differential information update notification means provided in said first apparatus for extracting only differential information of said database of said first apparatus and issuing a notification of the differential information to said second apparatus;
   second differential information update notification means provided in said second apparatus for extracting only differential information of said database of said second apparatus, issuing a notification of the differential information to said first apparatus and updating said database of said second apparatus with the differential information of said database of said first apparatus,
   a power supply for said second apparatus;
   a data buffer for receiving the differential information transmitted from said first differential information update notification means, temporarily storing the received differential information and transferring the stored differential information to said second apparatus; and
   power supply control means for controlling said power supply for said second apparatus when the differential information from said first differential information update notification means is stored into said data buffer.

2. A database synchronization system as claimed in claim 1, wherein said network is the Internet, and said second apparatus is connected to said first apparatus through a server of a service provider on the Internet.

3. A database synchronization system for databases as claimed in claim 1, wherein said data buffer and said power supply control means are included in a packet communication apparatus which performs packet communication on said first apparatus side.

4. A database synchronization system as claimed in claim 3, wherein said packet communication apparatus is built in said second apparatus.

5. A database synchronization system as claimed in claim 3, wherein said packet communication apparatus transfers, when said data buffer receives the differential information from said first differential information update notification means while said power supply for said second apparatus is off, the differential information in said data buffer to said second apparatus after said power supply of said second apparatus is placed into an on state by said power supply control means.

6. A database synchronization system as claimed in claim 5, wherein said power supply control means controls said power supply for said second apparatus to an off state when update of said database of said second apparatus is completed.

7. A database synchronization system as claimed in claim 3, wherein a packet conversion server is built in said first apparatus.

8. A database synchronization method for synchronizing data of databases of a first apparatus and a second apparatus connected to each other through a network, comprising the steps of:
   issuing a notification of the differential information in said database of said first apparatus to a packet communication apparatus by said first apparatus and transmitting the differential information to a packet communication apparatus;
   storing, when differential information of said database of said first apparatus is transmitted from said first apparatus to said second apparatus while said power supply for said second apparatus is off, the differential information into a data buffer of the packet communication apparatus;

controlling said power supply for said second apparatus to an on state by power supply control means of said packet communication apparatus; and transferring the differential information of said data buffer to said second apparatus and updating said database of said second apparatus.

9. A database synchronization method as claimed in claim 8, wherein said power supply control means controls said power supply for said second apparatus to an off state after update of said database of said second apparatus is completed.

10. A database synchronization system for synchronizing data of databases of a first apparatus and a second apparatus connected to each other through a network, comprising:

a first differential information update notification means provided in the first apparatus for extracting only differential information of the database of the first apparatus, issuing a notification of the differential information to the second apparatus and transmitting the extracted differential information to a packet communication apparatus;

a second differential information update notification means provided in the second apparatus for receiving the extracted differential information of the database of the first apparatus, a power supply for the second apparatus; and a packet communication apparatus comprising:

a data buffer for temporarily storing differential information; and a power supply control means for controlling the power supply for the second apparatus;

wherein when the packet communication apparatus receives the differential information from the first differential information update notification means while the power supply for the second apparatus is off, the packet communication apparatus stores the received differential information into the data buffer and the power supply control means switches on the power supply of the second apparatus;

wherein once the power supply of the second apparatus switches on, the second differential information update notification means updates the database of the second apparatus with the differential information stored in the data buffer;

wherein once the second differential information update notification means concludes updating the database of the second apparatus, the packet communication device deletes the differential information stored in the data buffer and the power supply control means switches off the power supply of the second apparatus.

11. A database synchronization system for synchronizing data of databases of a first apparatus and a second apparatus connected to each other through a network, comprising:

a first differential information update notification means provided in the first apparatus for extracting only differential information of the database of the first apparatus, issuing a notification of the differential information to the second apparatus and transmitting the extracted differential information to a packet communication apparatus;

a second differential information update notification means provided in the second apparatus for receiving the extracted differential information of the database of the first apparatus;

a power supply for the second apparatus; and a packet communication apparatus comprising:

a data buffer for temporarily storing differential information; and a power supply control means for controlling the power supply for the second apparatus;

wherein when the packet communication apparatus receives the differential information from the first differential information update notification means, the packet communication apparatus stores the received differential information into the data buffer;

wherein only when the power supply of the second apparatus is switched on, the second differential information update notification means polls the packet communication apparatus to determine whether differential information is stored in the data buffer and if there is differential information stored in the data buffer, the second differential information update notification means updates the database of the second apparatus with the differential information stored in the data buffer;

wherein once the second differential information update notification means concludes updating the database of the second apparatus, the packet communication device deletes the differential information stored in the data buffer.

12. A database synchronization method for synchronizing data of databases of a first apparatus and a second apparatus having a power supply connected to each other through a network, comprising:

transmitting differential information of the database of the first apparatus to a packet communication means having a data buffer and a power supply control means for controlling power supply of the second apparatus;

receiving the differential information of the database of the first apparatus at the packet communication means, switching on the power supply of the second apparatus by the power supply control means in the packet communication mean if the power supply of the second apparatus is in an off state and storing the received differential information of the database of the first apparatus into the data buffer of the packet communication means;

updating the database of the second apparatus with the differential information from the data buffer of the packet communication means, once the power supply of the second apparatus switches on;

switching off the power supply of the second apparatus and deleting the differential information stored in the data buffer of the packet communication means, once the updating the database of the second apparatus concludes.

13. A database synchronization method for synchronizing data of databases of a first apparatus and a second apparatus having a power supply connected to each other through a network, comprising:

transmitting differential information of the database of the first apparatus to a packet communication means having a data buffer and a power supply control means for controlling power supply of the second apparatus;

receiving the differential information of the database of the first apparatus at the packet communication means and storing the received differential information of the database of the first apparatus into the data buffer of the packet communication means;

polling the data buffer of the packet communication means by the second apparatus only when the power supply of the second apparatus is switched on either manually or automatically to determine if differential information is stored in the data buffer, transferring the differential information stored in the data buffer of the packet communication means into the database of the second apparatus once it is determined that the differential information is stored in the data buffer of the packet communication means and updating the database of the second apparatus with the differential information from the data buffer of the packet communication means;

deleting the differential information stored in the data buffer of the packet communication means once the updating the database of the second apparatus concludes.

* * * * *